T. P. WALSH.
LOOM FOR WEAVING KNOTTED FABRICS.
APPLICATION FILED APR. 8, 1908.

1,067,205.

Patented July 8, 1913.
9 SHEETS—SHEET 1.

Fig. 1

Inventor
Thomas P. Walsh

T. P. WALSH.
LOOM FOR WEAVING KNOTTED FABRICS.
APPLICATION FILED APR. 8, 1908.

1,067,205.

Patented July 8, 1913.
9 SHEETS—SHEET 2.

Fig. 2.

Witnesses
J. P. Stinkel
J. J. McCarthy

Inventor
Thomas P. Walsh
by G. W. Maxwell,
Attorney

T. P. WALSH.
LOOM FOR WEAVING KNOTTED FABRICS.
APPLICATION FILED APR. 8, 1908.

1,067,205.

Patented July 8, 1913.

Witnesses

Inventor
Thomas P. Walsh
by Geo. H. Maxwell,
Attorney

T. P. WALSH.
LOOM FOR WEAVING KNOTTED FABRICS.
APPLICATION FILED APR. 8, 1908.

1,067,205.

Patented July 8, 1913.

Witnesses

Inventor
Thomas P. Walsh
by Geo. W. Maxwell,
Attorney.

T. P. WALSH.
LOOM FOR WEAVING KNOTTED FABRICS.
APPLICATION FILED APR. 8, 1908.

1,067,205.

Patented July 8, 1913.

Witnesses
J. G. Hinkel
J. J. McCarthy

Inventor
Thomas P. Walsh
by Geo. H. Maxwell,
Attorney

UNITED STATES PATENT OFFICE.

THOMAS P. WALSH, OF WORCESTER, MASSACHUSETTS, ASSIGNOR TO WALSH-BAKER CORPORATION, OF PORTLAND, MAINE.

LOOM FOR WEAVING KNOTTED FABRICS.

1,067,205.   Specification of Letters Patent.   Patented July 8, 1913.

Application filed April 8, 1908. Serial No. 425,918.

*To all whom it may concern:*

Be it known that I, THOMAS P. WALSH, a citizen of the United States, and resident of Worcester, in the county of Worcester and State of Massachusetts, have invented an Improvement in Looms for Weaving Knotted Fabrics, of which the following description, in connection with the accompanying drawings, is a specification, like letters on the drawings representing like parts.

My invention relates to the weaving of oriental rugs, being another form of loom for accomplishing certain of the objects pointed out more at length in my co-pending application, Serial No. 415,780, filed February 13, 1908.

The loom of the present application ties a continuous warp pile around the ground warp in a series of integral or continuous pile loops to be subsequently cut.

Another novel feature resides in arranging the ground warps in a series of double strands or loops extending the length of the rug to be woven, thus greatly facilitating and simplifying the manufacture of an oriental rug.

In the preferred form of my invention, the pile loops are looped on this ground warp loop, an entire line or transverse series of pile loops being simultaneously knotted in position and then beaten up. While the beating up of these knotted piles may be accomplished by various mechanisms, I prefer to accomplish it in connection with the pile wire, the arrangement being such that it produces at the same time the desired irregularity or lack of evenness in the beating up of the piles which characterizes the genuine oriental rug.

Besides the above mentioned features, my present loom embodies a large number of other new features of importance, such as means for running the pile wire into position sidewise, and preferably from one end of the loom, a particular knotter mechanism, which, although herein shown as employed for knotting warp on warp, is not restricted thereto, a special pattern head whose needles coöperate with the knotter in forming the knots of the piles, said pattern head having, instead of the ordinary pattern cards, an exceedingly simple, compact, and durable form of card and coöperating indicating pins and needle actuators such that a single line of coöperating means effects all the movements required for a complicated pattern. This means may consist of a variety of devices, but is herein shown as preferably a row or series of pins and a corresponding row of card holes or position-determining devices for said pins.

Another novel feature resides in the shedding mechanism which permits the knotted pile loop to be beaten up past the shed, and likewise permits the weaving of a series of piles lengthwise of the ground warp with a continuous warp, said shedding mechanism, in its preferred form, consisting of a series of alternately operating warp lifters which engage and disengage the warps in the required order.

A further feature resides in the provision of a movable breast beam to slacken the ground warps at the time of the shedding, etc. Furthermore, I give this breast beam a compensating movement which compensates for the gradual taking up or shortening of the ground warps as the weaving of the rug progresses.

In the drawings, in which I have shown one of the preferred embodiments of the invention.

In its preferred form, I provide a warp beam 1 of usual construction mounted on the front end of the frame 2 which delivers the required complement of ground warps 3 to a traveling comb 4 through whose eyes 5 the warps are led, and are clamped at their free ends by one or the other of a pair of clamping bars 6, 7, preferably by the bar 6, held in place by thumb screws 8 at their opposite ends. The ends 9 of the comb 4 project into guide slots 10, said comb being caused to travel lengthwise of the loom in said guide slots by any suitable means, as by a pinion 11 engaging a rack 12, said pinion being fast on a shaft 13 journaled in brackets 14 mounted on the comb, and said shaft being shown as operated by a hand wheel 15. The traveling comb 4 carries rearwardly the warps to suitable devices adjacent the opposite end of the loom over which they are caught, and then the comb moves back with the warps to its original position, the result of this excursion being the formation of a long ground loop in each warp the width of the rug being woven. When the traveling comb gets back to its original position the second or return strand of each of said loops is locked or clamped in position by the clamping bar 7. In the loom of the drawings, the means which holds the rear end of each loop is the upper hook-shaped portion 16 of the knotter, shown best in detail in Fig. 10, one of said knotters being provided for each loop 17 of the ground warp. Slidingly mounted in a groove or passage 18 in the hook 16 is a slender needle-like switch 19 arranged to span the thread opening 20 for transferring the pile loop onto the ground warp loop, as will presently be described. The hooks 16 of the knotters are all carried on a rigid cross bar 21 fastened to the frame at 22, and the switch devices 19 are mounted side by side in a bar 23 and herein shown as arranged to be simultaneously operated by a bell crank lever 24 pivoted at 25 and actuated by a path cam 26 engaging its cam roll 27. Said cam is fast on a shaft 28 whose gear 29 is in mesh with a pinion 30 on the main driving shaft 31, provided with usual fast and loose belt pulleys 32, 33. Below the switch 19 the knotter is provided at its rear side with an inclined wall 34 and adjacent thereto is a second hook-shaped member 35, which for convenience of names may be called a loop holder, there being one hook or loop holder proper 36 for each knotter. For strength and convenience of manufacture, I make all or at least a large number of these loop holders on a single plate extending transversely of the loom and simply provide at the front edge of said plate or plates the required series of hook-like fingers or loop holders 36, said plate or plates being pivotally mounted on a shaft 37 and actuated by a cam 38 whose shaft 39 carries a gear 40 meshing with a pinion 41 fast on a shaft 42 driven by gears 43, 44. Conveniently mounted adjacent the knotters are two warp shifters or loop shifters, one 45 for moving the loops 17 down to the position 46 when the switch 19 is moved out of the way to permit it, the loop holder 36 being at that moment in its raised position close to the bottom of the thread opening 20, and the other 47 for moving the loops 17 up again to their original position. The warp shifter 45 is herein shown as a transverse rod whose bent ends 48 are fast in pinions 49 engaged by racks 50 which cause said bent ends 48 to act as cranks to whip over the rod 45 to the front side of the knotter members 16 on top of the series of loops 17 and thereby move the latter readily downward as stated. The racks 50 are held in position by guide arms 51 and actuated by a cam lever 52 pivoted at 53 and provided with a cam roll 54 traveling in a path cam 55 of a cam on the shaft 42. The warp shifter 47 is shown as a transverse rod mounted in the free upper ends of arms 56 pivoted at 57 to a cam lever 58 carried by a fixed pivot 59, and provided with a cam roll 60 traveling in a path cam 61 on the shaft 28.

Located at a convenient point adjacent the rear end of the loom and preferably above the mechanism just described is the pattern head or pattern control provided with a series of pile thread carriers, which, although they may have a great variety of forms or embodiments, preferably consist of needle-like devices 63, each provided with an eye 64 for carrying the pile thread 65, which has first been secured at its free end to the breast beam, said pile thread carriers being herein shown as held vertically yielding by springs 66 in a transverse yoke 67 mounted at its opposite ends on stands 68 to have a limited longitudinal movement by means of a lever 69 centrally pivoted at 70 and laterally moved or swung by a roll 71 traveling in a cam path 72 of a cam 73 fast on a shaft 74 carrying a sprocket wheel 75 driven by a sprocket chain 76 from the shaft 42. The number of needles or pile thread carriers 63 counting lengthwise of the yoke corresponds to the number of knotters, and it will readily be understood by those skilled in the art that the number of needles counting transversely of said yoke, i. e. as viewed Fig. 3 will depend upon the color or kinds of pile thread being used or required by the pattern. The pile threads are herein shown as warps, and will be supplied in usual manner from a creel or any other well known distributing mechanism.

Figure 1:
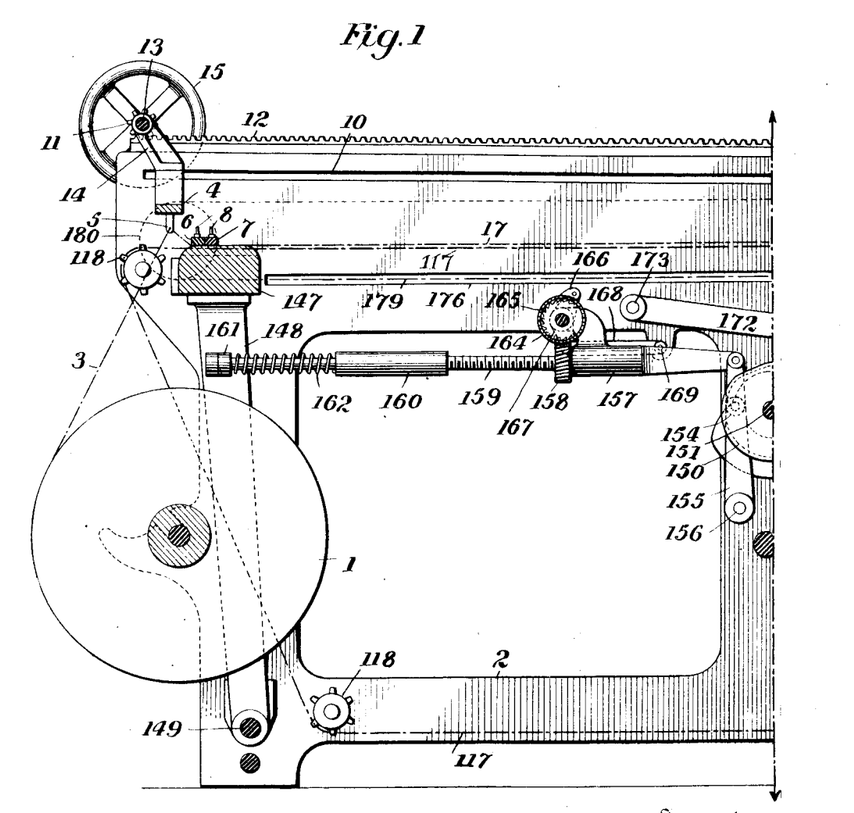
Figures 1 and 2 are central vertical longitudinal sections, together showing practically the entire loom.
Figure 2:
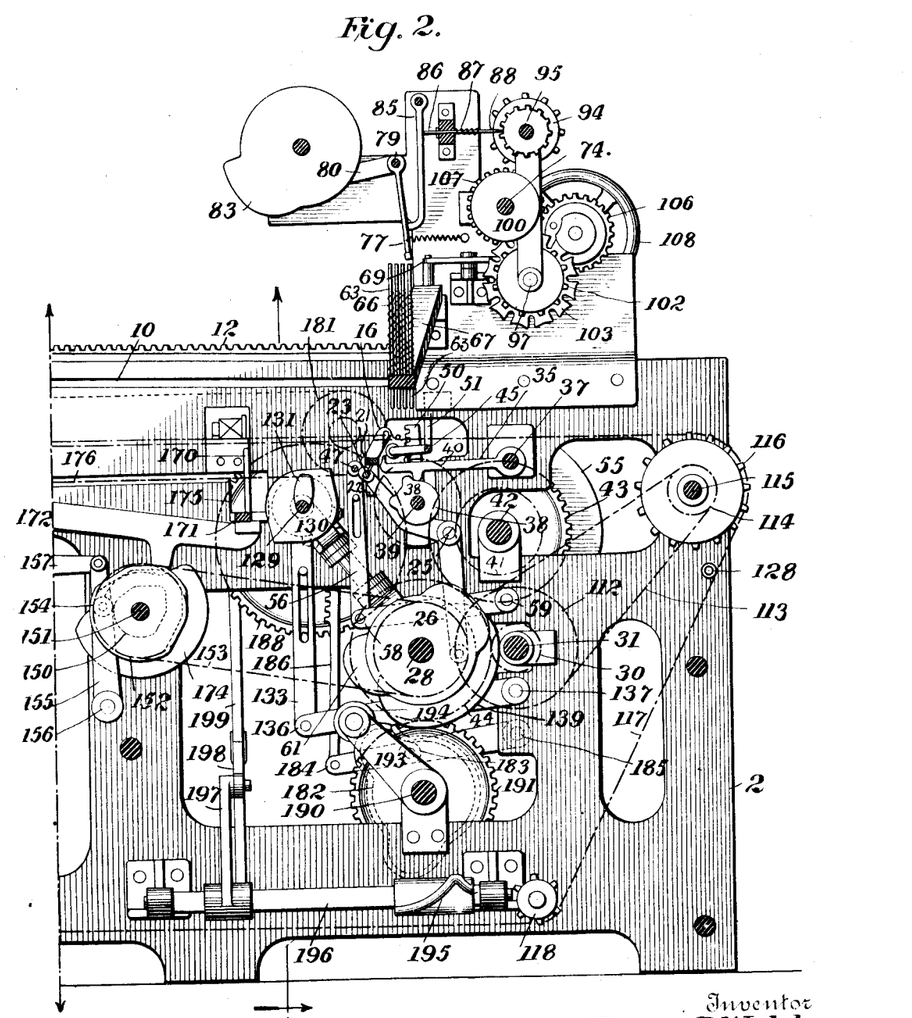
Figure 3:
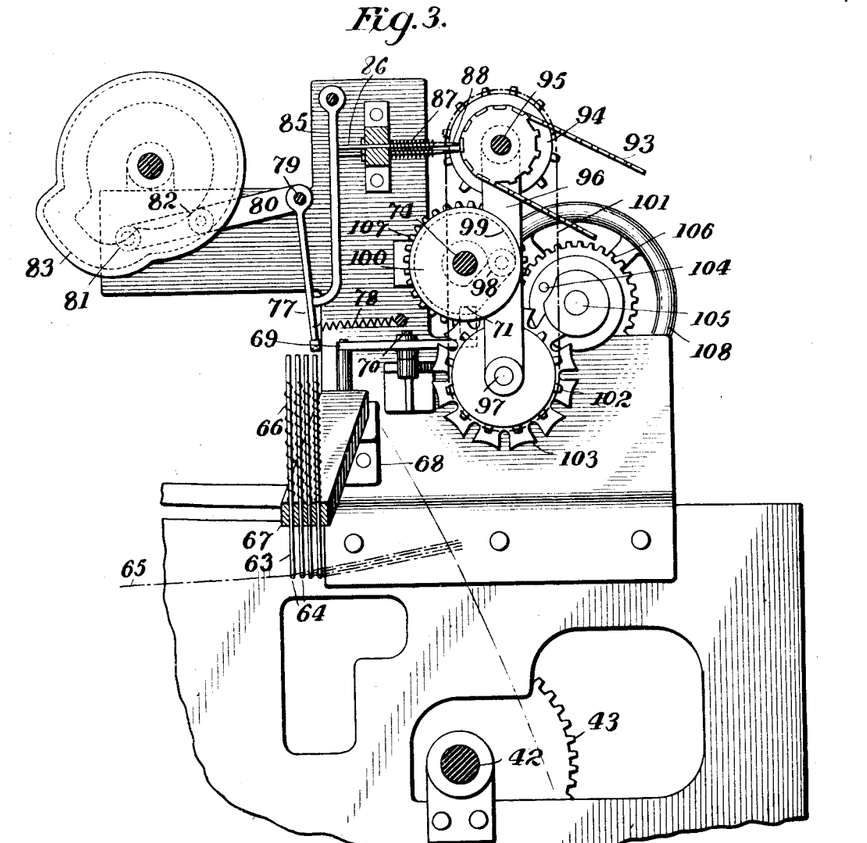
Fig. 3 is an enlarged fragmentary detail of an upper rear portion of Fig. 2, showing more particularly the pattern head.
Figure 4:
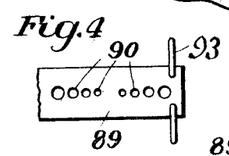
Figs. 4 and 5 are plan views, and Fig. 6 an edge view of forms of pattern card.
Figure 5:
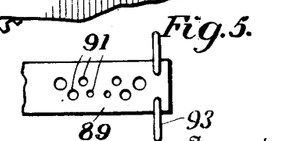

The selectors which actuate the given pile thread carrier required at any given moment are herein shown as each consisting of a pusher or actuator 77 normally held over the rearmost carrier by a spring 78, said selector being pivoted at 79 to an arm 80 pivoted at 81 to the frame of the machine and provided with a cam roll 82 actuated by a cam 83 which is driven by a sprocket chain 84 from the shaft 74. Each selector 77 is shifted in position by a swinging finger 85 which is pushed forward by an indicating device, herein shown as a pin or plunger 86 normally held rearwardly by a spring 87 and preferably having a conical end 88. The pattern plate coöperating with the pins 86 is best shown in Figs. 3, 4, where it will be seen that instead of requiring the large, elaborate and, for some purposes, impracticable card usually employed in a Jacquard head, I employ a narrow, preferably metal, plate 89 having a series of holes 90 of varying diameters, so that the conical end 88 of the indicating device will enter to different distances. I regard this pattern control as of particular value, as thereby I am enabled to accommodate an intricate pattern so as to get an exceedingly large number of piles to the inch without occupying an unusual amount of space. This is of advantage also in the space occupied in storing the cards, keeping them in order, etc. The main advantage of this construction is that by depending on one series or line only of holes or controlling means, the card may be very narrow and yet perform all the offices of the usual large and complicated pattern. As there is only one series or line of holes, these holes, for very fine work, can be staggered or placed very close together as indicated at 91, Fig. 5 the pins or indicating devices 86 being correspondingly arranged. Preferably there is a blank space instead of a hole at one stage or meeting point to receive the indicating device, whenever it is desired to cause the loom to weave without putting in pile all the way across or to have the borders plain without pile or to have the pile loop tied on in a plurality of widely separated places, said blank space operating to push the selector over so far that when it comes down it will not push the pile-carrying needle and so will not carry a pile thread around the looper.

Figure 6:
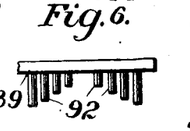
Figure 7:
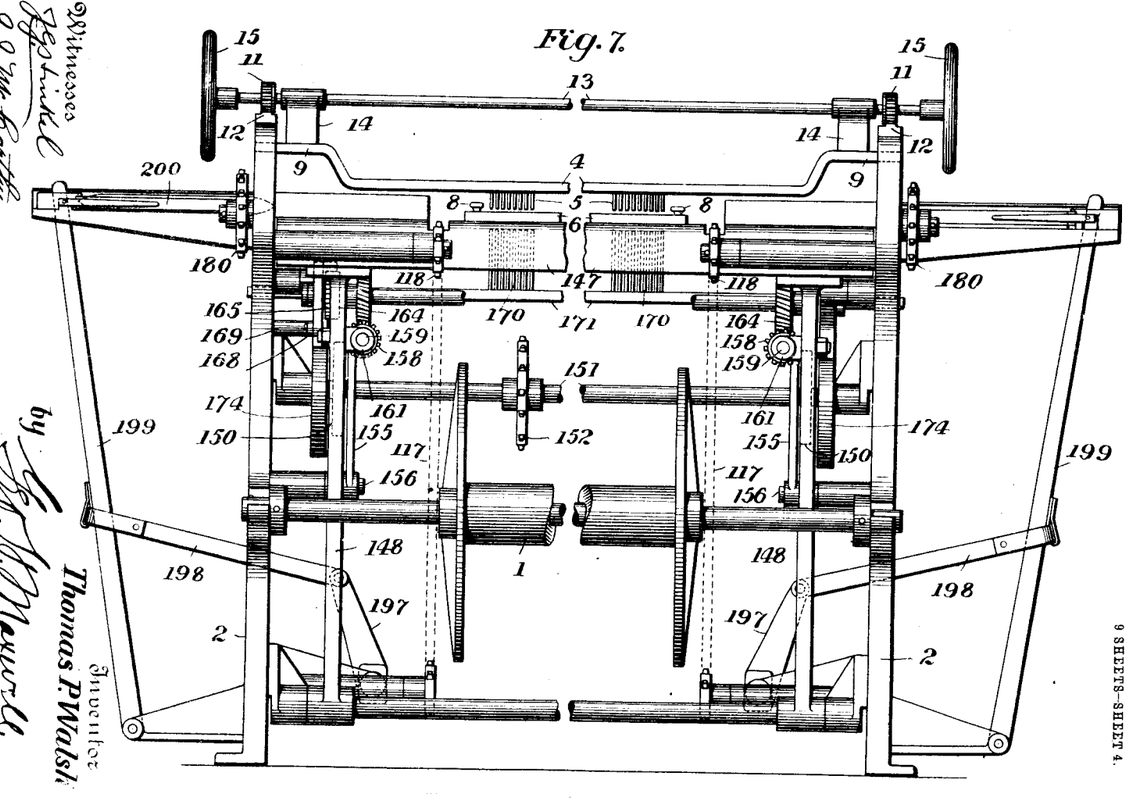
Fig. 7 is a front elevation of the loom.
Figure 8:
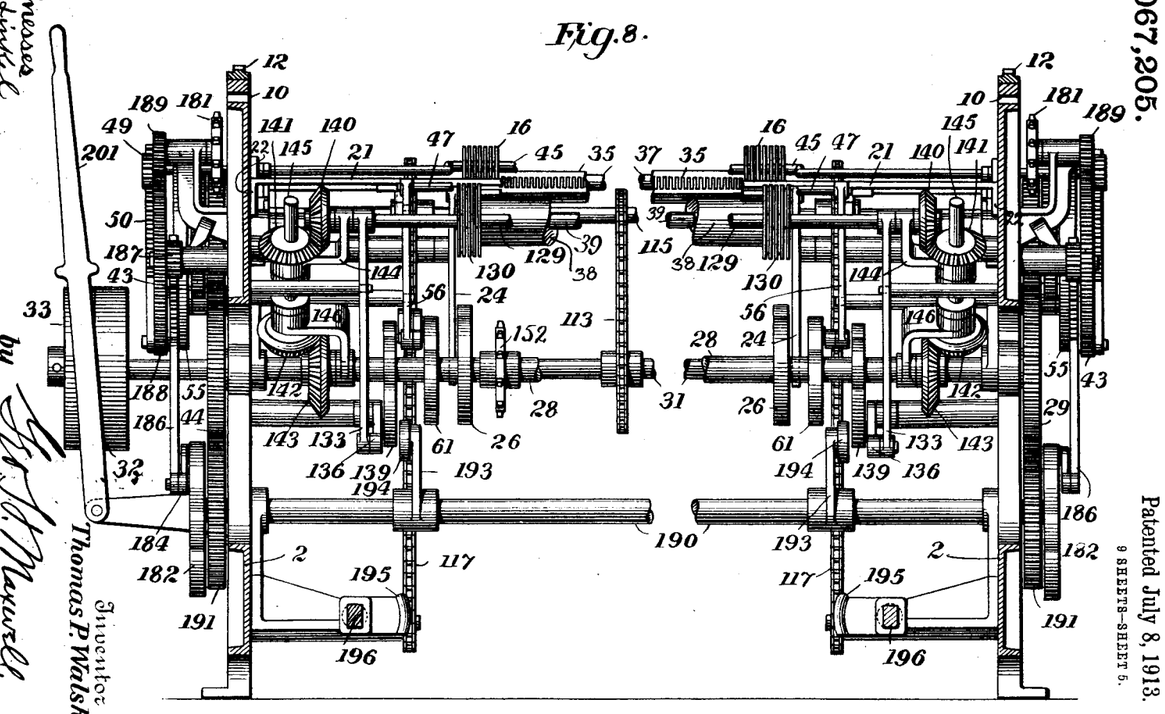
Fig. 8 is a transverse vertical section showing more particularly the shedding mechanism in front elevation.

While I prefer to employ holes, it will be understood that I am not limited to this construction, as projections may be employed as indicated at 92, Fig. 6 or the indicating device 86 and cards may be formed in various other ways whereby the card performs the office of a single row of pattern control means and the indicating device 86 coöperate therewith in being projected to varying extents so as to bring the selectors 77 over one or the other of the series of transverse needles 63 as desired. The pattern plates 89 are preferably connected together in the form of a chain 93 in well known manner, being moved in desired progression by sprocket wheels 94 on a shaft 95, and the latter is carried at the upper end of hangers 96 pivoted at 97 and actuated by a cam roll 98 traveling in a path cam 99 of a cam wheel 100 on the shaft 74. The shaft 95 is driven by a sprocket chain 101 mounted at its lower end on a sprocket wheel 102 actuated by a star wheel 103 driven by the pin 104 of a pin wheel fast on a shaft 105 provided with a loose gear 106 in mesh with a pinion 107 on the shaft 74. The shaft 105 is also preferably provided with a hand wheel 108, a spring-held hand bolt 109 serving to connect or disconnect the pin wheel from the gear 106 at the will of the operator, whereby if it is desired to reverse the pattern chain for any reason or to stop the travel of the pattern so as to cause the loom to keep repeating any given plate it may readily be done. Preferably a similar spring-actuated hand bolt 110 is provided to enable the operator to connect or disconnect at will the gear 43 and the sprocket chain 76. This enables the operator to disconnect the pattern mechanism when for instance it is desired to weave a strip of plain ground warp and ground filling at the beginning and end of the loom proper. It also performs a useful purpose in permitting the weaving of a rug with weft pile instead of warp pile, as will presently be explained more at length.

Figures 9, 10, 11:
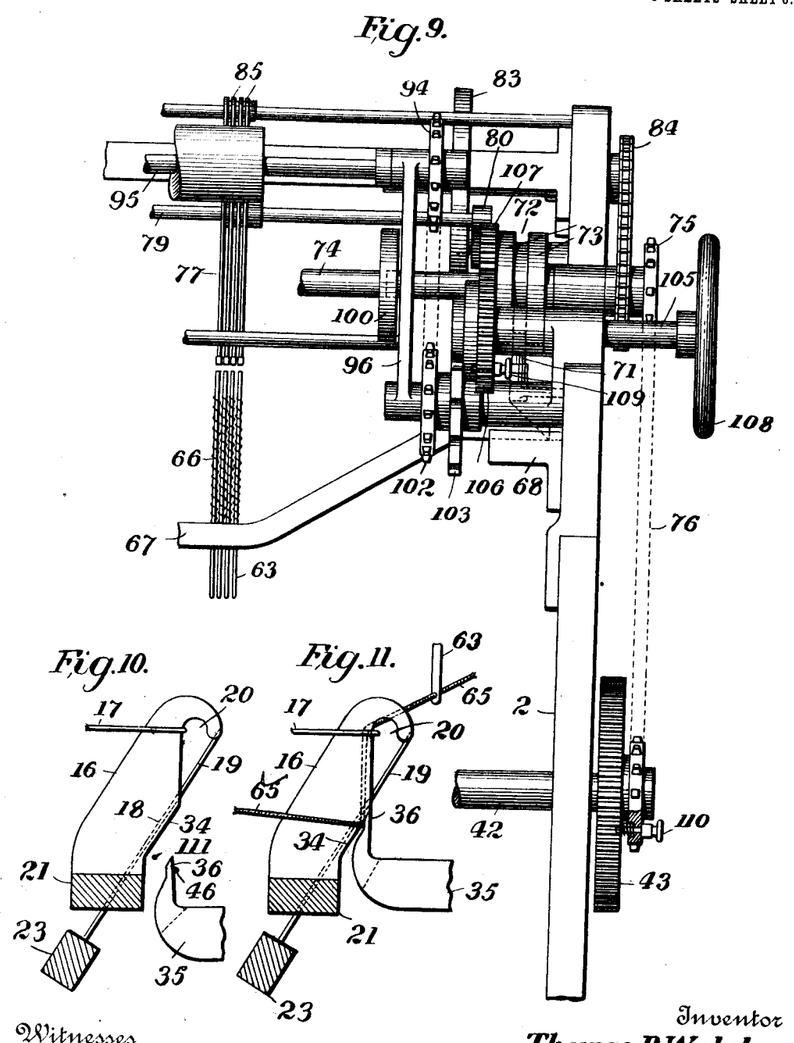
Fig. 9 is a fragmentary view at the left hand rear end of the loom.
Figs. 10 and 11 are enlarged sectional details showing the knotting mechanism in two positions.
Figure 12:
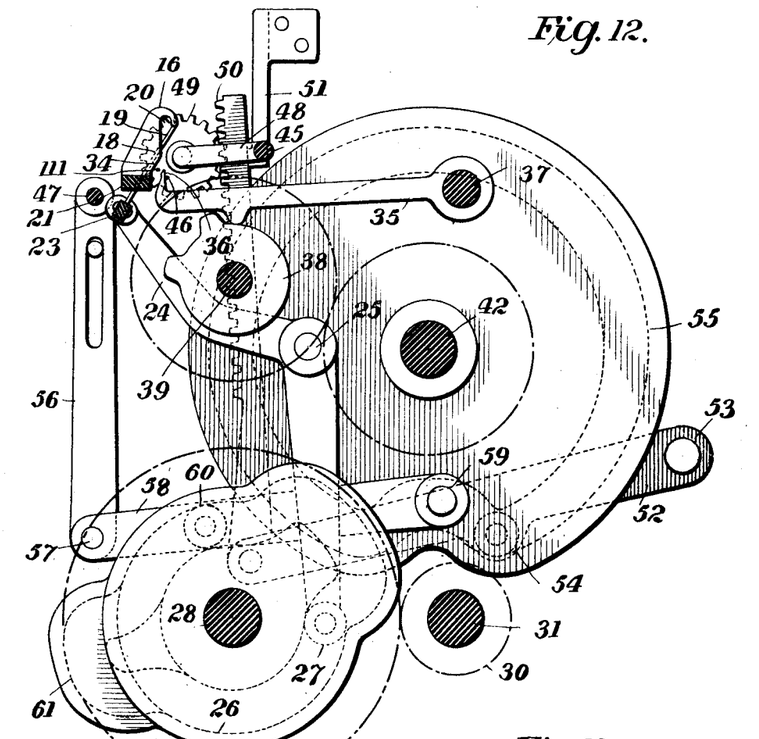
Fig. 12 is a cross sectional view showing the knotting mechanism in enlarged detail.
Figure 13:
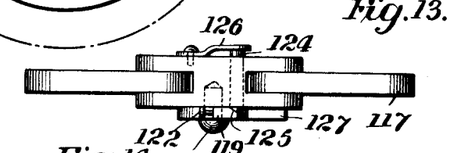
Figs. 13 and 14 show in plan and side elevation respectively details of the pile wire carrying chain.
Figure 14:
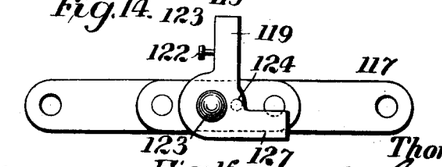
Figure 15:
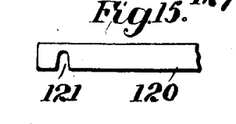
Fig. 15 is a fragmentary view in front elevation of one end of the pile wire.
Figures 16, 17:
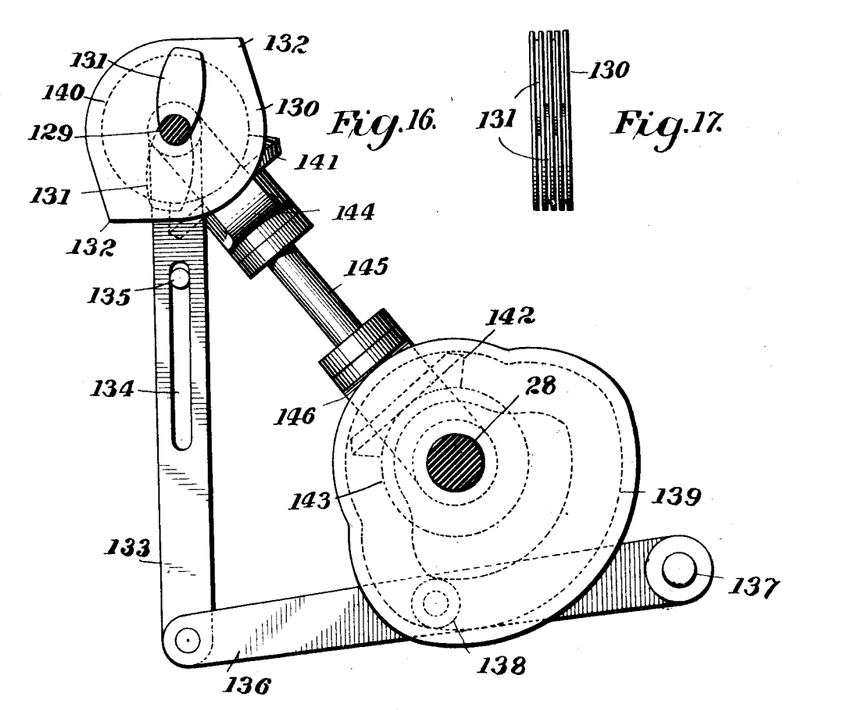
Fig. 16 is a cross sectional view showing in side elevation a portion of the shedding mechanism.
Fig. 17 is an edge elevation of the shedding separators.
Figure 18:
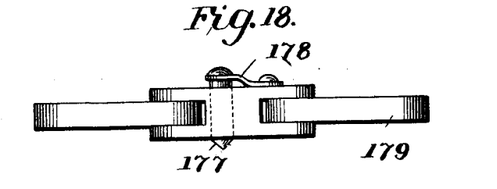
Figs. 18 and 19 show in top plan and side elevation respectively the sprocket chains for the beating up comb.
Figure 19:
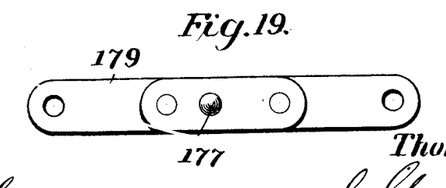
Figure 20:
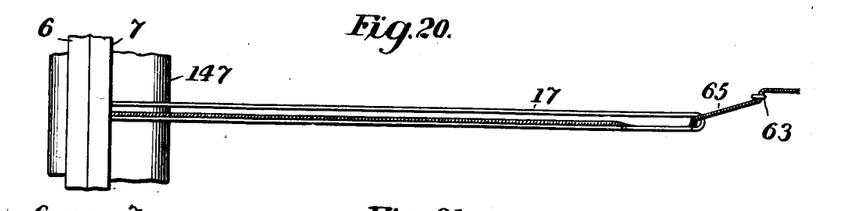
Figs. 20–23 are plan views showing the successive steps of the weaving process.
Figure 21:
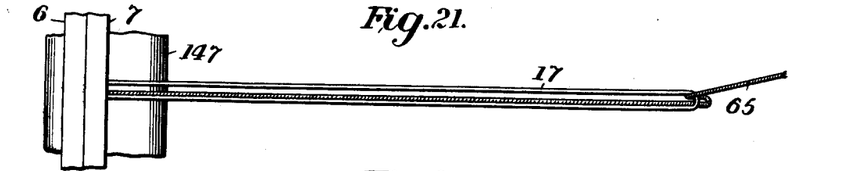
Figure 22:
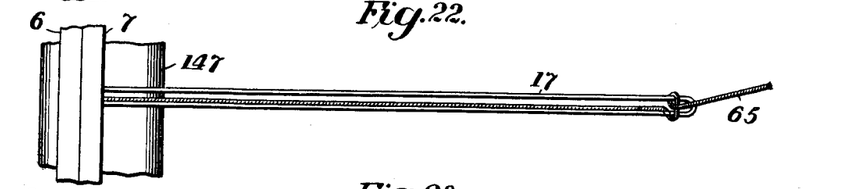
Figure 23:
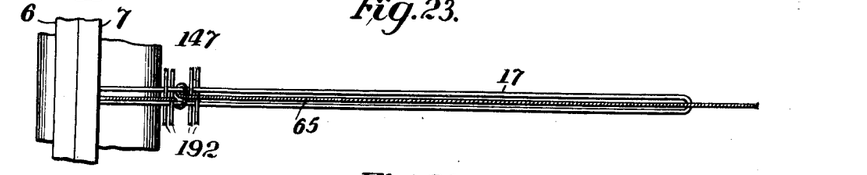
Figure 24:
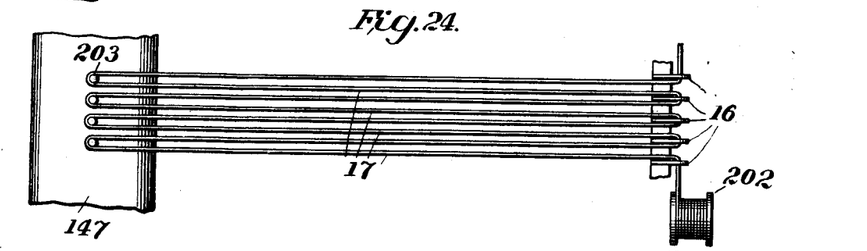
Fig. 24 is a similar view showing a modified way of placing the warp in the loom.

To render the pile-forming movements clear, it may be well at this point to recapitulate the movements briefly. The knot is formed by placing the pile loop inside of the warp loop and then throwing the pile loop over the end of the warp loop, by which movement the pile loop is crossed inside of the warp thread. This is accomplished by first moving the switch device 19 down so as to open the thread eye 20 of the knotter, whereupon the warp shifter 15 swings over forward and moves the warp loop 17 down onto the loop holders 36, which then move down to the position shown Fig. 10. The pile thread carriers 62 are then moved downwardly so as to bring the pile threads 65 down along or across one side of the knotter members 16 and are then shifted slightly transversely of the loom so as to draw the pile threads across the rear edges of the knotter members 16 in the position 111, Fig. 10. Thereupon the loop holder 36 rises so that its upper hooked end engages the bottom of the thread opening 20, whereupon the loop shifter 17 moves upwardly and passes the loop 17 off from the loop holder 36 into engagement with the knotter member 16, and then the switch 19 moves up into its original position, as shown in Fig. 11. As the loop 17 is entering the eye 20 the loop holder 36 is lowered out of the way and, as it is moving down, the pile thread carrier moves up, thereby pulling upon the loop of the pile thread 65 so that it slips upwardly along the switch device 19 until it escapes over the curved upper end of the knotter member 16, and thence back onto the two strands of the ground warp loop 17 Fig. 22. In other words, the loop of pile thread (Fig. 21) is carried down about the hook 16 and within the loop 17 of warp thread held by the holder 36, and then, after the return of the warp loop 17 to its normal position within the eye 20 and the closing of said eye by the sliding member or switch 19, the extreme end of the pile loop is slid over the hook 16 and eye 20, and therefore over or outside of the warp loop 17 to the position shown diagrammatically in Fig. 22, and the coiling characteristic of the Turkish knot is effected. The ends of the pile thread are so held with reference to the warp loop that the pile loop goes down inside the warp loop and comes up outside the warp loop, thereby producing the desired coil of pile thread around each warp strand, the end portions of the pile thread crossing the two warp strands on the inside, and the intermediate or loop-portion of the pile thread crossing on the outside, as clearly shown diagrammatically in Fig. 23. In this manner the well known double knot, characteristic of Turkish rugs, is formed on the two strands of said loop 17. It remains now to beat up this knot and form the pile. This is accomplished as follows: On the driving shaft 31 is a sprocket wheel 112 driving a sprocket chain 113, sprocket wheel 114, shaft 115 and large sprocket wheel 116 which is engaged by a chain 117 passing over guide wheels 118, one of these sprocket chains 117 being provided at each side of the loom. On this sprocket chain are pile wire carriers 119, shown in Figs. 13 and 14. The pile wires 120 are provided at their opposite ends with notches 121 Fig. 15 and the pile wire carrier 119 is provided with a stud 122 in position to engage the adjacent notch 121 of the pile wire, so that the two opposite pile wire carriers, one on each chain, serve to hold the pile wire firmly and move it along bodily in parallelism to itself lengthwise of the loom. Each carrier 119 is pivoted at 123 on the sprocket chain and is yieldingly locked by a stud or pin 124 whose blunt or conical end 125 is held in yielding engagement with a corresponding recess in the carrier by a spring 126. Thus when the sprocket chains 117 and their carriers 119 move forward with a pile wire, the latter engages the pile threads or warps which have just been knotted around the loops 17 and moves said knotted pile threads forward with reasonable firmness, and as the chains 117 continue their forward movement the locking studs yield and permit the carriers 119 to turn down, allowing the wire to escape, said wire remaining in proper loop-forming position, while the chain continues its movement, and as the carriers reach any convenient point in their travel to be restored, as for instance the rear end of the loom, their then depending fingers 127 engage trips 128 which lift the wire carriers again into their operative position when the operator places thereon another wire, preferably during a dwell of the carriers. As soon as the pile warp has been thus moved to the fell, the shedding mechanism lifts and opens the shed and the beating up comb or reed also lifts to act as a guide for the shuttle and also get in readiness to beat up the ground filling or binder thread and the pile wire with its load of loops thus left at the fell.

The shedding mechanism is best shown in Figs. 2, 8, 16, 17 where it will be seen that I have mounted on a shaft 129 a series of disks or separators 130 between which are cam-shaped lifters or lifting fingers 131 arranged to extend alternately in opposite directions. The disks 130 preferably have projecting portions or points 132 at the rear of the members 131 and are arranged as close as practicable to the rear ends of the ground loops 17 to increase the certainty of the disks coming up between the wraps or strands of the loops 17 in proper position to perform the shedding operation. The shaft 129 is journaled in the upper ends of opposite lifting bars 133 slotted at 134 to slide on guide brackets 135 fast in the sides of the loom frame and lifted by levers 136 pivoted on the frame of the machine at 137 and provided with cam rolls 138 actuated by path cams 139; and the required rotary movement of the shedding disks is given by upper and lower pairs of bevel gears 140, 141 and 142, 143, the gear 141 being supported in a bracket 144 swiveled on the shaft 129 and having a sliding spline engagement with a connecting shaft 145 mounted fast with the gear 142, see Fig. 8. The gear 142 is journaled in a bracket 146 swiveled on the shaft 28. At the same time that the shedding motion takes place, the ground warps are slackened for the shed by the inward swinging of the breast beam 147. This is not only of value in the mechanism herein shown, but in various other relations; as, for instance, in weaving heavy duck, felts, etc., the easing of the warps would save the strain not only on the warps but on the shedding cams, and the loom in general, and would materially decrease the power required. The breast beam is carried by supports 148 pivoted at 149 and is swung in proper timed relation to the shedding by any suitable means as by a cam 150 on whose shaft 151 is a sprocket wheel 152 driven by a sprocket chain 153 from the shaft 28, said cam 150 actuating a cam roll 154 of a lever 155 pivoted at 156 at its lower end and connected at its upper end to a sleeve 157 provided with a spiral gear 158 threaded on the screw end 159 of a rod 160 held yieldingly in a stud 161 by a spring 162. On the sleeve 157 is a bracket carrying a spiral gear 164 for actuating the gear 158 and driven by a ratchet 165 whose pawl 166 is pivotally supported by an arm 167 mounted coaxially of the gear 164 and actuated by a link 168 fixedly pivoted at 169 to the frame. Thus at each shedding motion the breast beam is caused to slacken the ground warps, and the same inward movement of the breast beam automatically ratchets the spiral gear 164 around so as to rotate the gear 158 to shorten automatically the connection 157—160 and thereby compensate for the necessary shortening of the ground warps due to the process of weaving. The spring 162 permits the ground warps to yield whenever necessary without danger of breaking any of the warps or the loom. The beating up comb or reed consists of a series of more or less limber fingers 170, herein shown as projecting upwardly from a rigid cross bar 171 supported on the free ends of arms 172 pivoted at 173 and lifted by lifting cams 174 on the shaft 151. The ends of the bar 171 move upwardly in vertical slots 175 in the frame of the machine until they come into alinement with horizontal slots or guideways 176, and, after the proper picks of filling or binder weft are shot across, are engaged by yielding studs or dogs 177 held yieldingly forward by springs 178 and carried by sprocket chains 179 guided by sprocket wheels 180, 181 and given a reciprocatory movement by a path cam 182 which actuates the cam roll 183 of a lever 184 fixedly pivoted at 185 to the frame at one end and at its other end operating a rack bar 186 whose teeth engage a pinion 187 which operates a gear 188 in mesh with a pinion 189 fast on the shaft of the sprocket wheel 181. The cam 182 is carried by a shaft 190 driven by a gear 191 in mesh with the gear 44. Thus at each reciprocation of the beating-up sprocket chain 179, the beating-up comb is moved forcibly forward, carrying with it the binder threads, until it meets and gives a proper beating-up movement and blow to the product already woven, and especially to the last row of pile loops (which loops have as yet been merely moved to the fell but not actually beaten or forcibly positioned) whereupon the resistance of the latter causes the dogs 177 to yield out of carrying engagement with the reed or beating-up comb, leaving the latter there, and picking it up again on the way back when it is carried to the rear end of the guideways 176 and lowered to its original position by the arms 172 until required for another pick.

From the above it will be seen that both the beating-up reed or comb and the shedding motion are normally out of the way of the passage of the knotted pile thread, but are moved instantly into operative relation with the ground warps whenever needed. The reed or beating-up comb has its fingers made more or less yielding so as to produce the desired irregularity of weaving which commonly characterizes hand-made oriental rugs. This effect is transmitted to both the pile threads and binder threads by the beating-up action of the reed on both of said threads at the fell. The pile wire, having formed the loops, *i. e.* having properly pulled up above the ground warp strand the slack yarn that has been coiled around said ground warp, holds all the loops in proper form or at proper height across the loom and transfers or slides the coils along the ground warp strands as the wire is moved to the fell, the main purpose of this wire being simply to keep the pile warp yarns always projecting above the body of the fabric to the proper extent between successive coilings around the ground warp strands, so that when the reed performs its beating-up movement, it will properly beat up all the knots as well as the binder picks. And as the reed fingers are somewhat yielding, they necessarily give a somewhat irregular pressure or beat against the pile warp strands and the binder strands, which results in producing the desired oriental characteristics in this particular. The ground filling or binder weft is indicated at 192, Fig. 23 and may be introduced by any usual or preferred picker mechanism. As herein shown, the shaft 190 is provided with a picking arm 193 whose roll 194 engages and actuates a picking shoe 195 on a rock shaft 196 provided with a crank 197 and link 198 for actuating in usual manner a picker stick 199 to drive a shuttle 200, duplicate parts being provided at the opposite sides of the loom in usual manner. The loom may be provided with any other usual appliances, and it will be understood that I have undertaken herein to show merely those features which constitute my invention. For instance, automatic and hand shippers may be employed as usual, a hand shipper being indicated at 201.

In operation, the free ends of the ground warps 3 are led up from the warp beam 1 through the eyes 5 of the traveling comb 4 and clamped under the clamping bar 6 to the breast-beam. Thereupon the hand wheel 15 is rotated over to the rear, causing the traveling comb 4 to move rearwardly, guided at its opposite ends by the slots 10, until it has pulled the ground warps 3 forward to form the required number of double strands or loops 17. As soon as these loops have been properly engaged by the hooks 16 of the knotters, the traveling comb is moved again forward to its original position and the free end of each loop 17 is secured by the bar 7 to the breast beam. The pile threads 65 are then led from whatever source of supply is employed, such as a creel or the like, and threaded through the eyes 64 of the needles 63 and led forward to the breast beam, where they are secured by any suitable means, as by one of the bars 6, 7. The hand bolt 110 is then moved to disconnect the pattern mechanism, and the loom is started so as to introduce the desired number of shots of plain ground filling to constitute the usual plain strip at the beginning of the rug. Having done this, the pattern mechanism is operatively connected by the hand bolt 110, and thereafter the weaving proceeds in regular oriental rug fashion as shown in Figs. 20—23. The switch 19 of the knotter is first moved downwardly out of the way, and then the warp shifter 45 is swung over by its rack 50 until it has moved all the loops 17 down onto the loop holders 36, which meanwhile have been raised close against the wall 34 of the hook 16, and thereupon the loop holders 36 are moved down to their position shown in Fig. 10. While these movements have been taking place, the pattern head has operated to bring the selectors 77 over the desired needles 63 which are thereupon depressed so as to move the pile threads down respectively against one side, herein shown as the inner side, of the members 16 of the knotter, Fig. 11, and then a slight lateral movement is given to the needles by the lever 69, sufficient to deflect the warp threads 65 at 111 Fig. 10, across the rear edges of the members 16 of the knotters, and thereupon the loop holders 36 are raised against the edge 34 again above the pile threads which are at 111, the loop shifter 47 is raised by its lever 58, thereby shifting the loops 17 from the loop holders 36 into the eyes 20 of the hooks 16 so that said loops 17 are now in their original position, as shown in Figs. 10, 11. Just as this movement is accomplished, the needles 19 are moved upwardly, closing the eye 20, the hooks 36 move down again and the needles 63 pull upwardly on the pile threads 65, with the result that the loop of pile thread 111 is pulled up along the switch 19 and over the smooth curved top of the hook 16 with a resulting twist or turn of pile thread on each of the two strands of each loop 17. These two turns or twists constitute the Turkish double knot which it is the object of the knotter to tie in the pile thread. Just as this movement has been completed the pile wire carrier chains 117 bring forward a pile wire 120 over the knotter but between the loops 17 and the pile threads 65 which are held raised by the needles 64 and as said pile wire is moved deftly forward it slides along with the row of knots which have been formed, thereby holding them in a continuous line or series across the entire width of the rug. The pile wire moves with said knots forward under the control of the reed or comb 170 until they are beaten firmly against the strip of ground filling previously mentioned, whereupon the resistance of the latter causes the holding dogs or pins 124 of the wire carriers to yield and permit the pile wire to be released, where it remains until the weaving of the rug is finished. The first row of knots having been formed as stated, the shedding mechanism comes into play; the separator disks 130 turning so that the point or nose 132 of each enters into its proper place between adjacent warps which are thereby held in position so that every other warp thread is raised by the cam lifter 131, as the latter is given a compound rotary and vertically lifted movement by the rotation of its shaft 145 and the lifting action of lever 136 thereby producing the desired shed. At the same time the reed or comb 170 has been lifted by its cam 174 so that it is in position to guide the shuttle as the ground filling is shot forward and back again, the shedding disks having been given a rotation between the two picks of the shuttle so as to cause one set of cam lifting fingers 131 to lower and the other set to rise so as to change the shed in obvious manner. The two picks of ground filling having been delivered as described, and the beating-up reed or comb 170 being still raised, it is quickly moved forward by the chain 179, thereby beating up the ground filling and also completing the positioning of the knotted pile loops by a final beating-up blow on their knotted pile threads previously partially positioned by the pile wire. When the beating-up reed or comb meets the previously woven portion of the rug, the resistance thereof releases it from its carrying chain 179, which then completes its forward movement and picks up the reed or comb again on its return movement and carries it back to its supporting arms 172, which lower it again out of operative relation with the ground warps or loops 17. The shedding mechanism has meanwhile also been lowered so that the knot-tying mechanism is again ready to operate and at once proceeds to tie another series of knots entirely across the rug. The unselected pile-forming threads 65 simply float above the goods from the fell until required by the pattern, and later these floating threads are clipped or sheared off when the completed fabric is trimmed.

Inasmuch as my present loom weaves a rug whose size is predetermined by the length of loops 17 which are originally drawn out and secured, I have provided compensating means for accommodating the continual shortening increment due to the taking up in length of the warps in the process of weaving, said compensating means depending preferably upon the novel feature of having the breast beam movable, a pivoted breast beam being herein shown which permits the relaxing of the ground warps for the shedding purpose and at the same time permits said compensating movement, which is accomplished by the automatic movement of the ratchet wheel 195 each time that the breast beam is moved forward for slackening the ground warps. The spring 162 constitutes a give-away to prevent disaster in case an exceptional movement of the breast beam should for any reason be necessary.

The movement of the beating-up comb or reed is further novel in that the reed moves in parallelism to itself, as distinguished from a swinging movement. I have found that this movement produces better rug effects. It will be understood that, although, for the preferred results, all the various details of the loom as above described will be used together, this is not in all cases essential. For instance, the ground loops 17 may be provided without the use of a warp beam of the kind and arrangement thus far described, as for example in Fig. 21. I have shown the warp as delivered from a spool 202 at one side of the frame in line with the knotters, in which case the warp is led straight across the machine and is then engaged by any suitable means between successive knotters and pulled forwardly into loops which are caught over pins 205 or any other suitable holding means on the breast beam 117, in which case all the loops 17 of the entire rug are formed from one single warp thread instead of from a series. Also, as already stated, I do not limit my invention in its preferred phases to forming the piles from warps, as my mechanism may be used for forming the piles from weft. In the claims I have used the word filler to mean any thread, weft, warp, pile, etc., excepting the ground warp and the word tying to mean the twisting, coiling, bending, or interlocking together in any other manner of the two threads so that they themselves constitute the joint or knot, as distinguished from being merely connected or held together or against each other by the pressure or aid of the other juxtaposed threads as in ordinary plain or pile weaving.

It will be furthermore understood that I am not restricted to the structural details of my loom as herein shown, excepting as otherwise set forth in the claims, inasmuch as a wide variety of changes, substitutions, and combinations of parts may be resorted to without departing from the spirit and scope of the invention.

Having thus described my invention, what I claim as new, and desire to secure by Letters Patent is:

1. In a loom, means to support a ground warp thread in weaving position, and mechanism to tie a pile warp thread directly upon the ground warp thread at a plurality of places in a series of uncut piles.

2. In a loom, means to support a series of ground warp strands in weaving position, and mechanism for knotting onto said ground warp strands a series of pile threads each continuous with a succession of knots along the length of the ground warp strands.

3. In a loom, means for holding and maintaining a loop of ground warp in weaving position, and knotting mechanism for knotting a pile thread thereon, including means for passing a loop-end of the pile thread around and embrace the loop-end and both strands of said ground warp loop.

4. In a loom, mechanism for continuous weaving, including means for holding and maintaining a loop of ground warp in weaving position, and knotting mechanism for repeatedly knotting a pile thread on both strands of said loop in the course of the continuous weaving operation of the loom.

5. In a loom, means for supporting the ground warp in pairs of strands, and mechanism for knotting a pile thread around each strand of a pair and then said thread intact again around said strands of said pair.

6. In a loom, means for supporting the ground warp in pairs of strands, mechanism for knotting a pile thread around each strand of a pair and then again around said strands of said pair, and means for forming the pile loop in said pile thread between the two knottings.

7. In a loom, means for supporting the ground warp in pairs of strands, mechanism for knotting a pile thread around each strand of a pair and then intact again around said strands of said pair, and mechanism for weaving in a ground weft to bind together the ground warps between the two knottings.

8. In a loom, mechanism for continuous weaving, including means for holding and maintaining a loop of ground warp in weaving position, and knotting mechanism for repeatedly knotting a pile warp thread on both strands of said loop in the course of the continuous weaving operation of the loom.

9. In a loom, means for holding and maintaining a loop of ground warp in weaving position, and knotting mechanism for knotting a pile warp thread thereon, including means for looping the pile warp thread around and to embrace the loop-end and both strands of said ground warp loop.

10. In a loom, mechanism for continuous weaving, including means for holding and maintaining a loop of ground warp in weaving position, and knotting mechanism for repeatedly knotting a pile thread on both strands of said loop in the course of the continuous weaving operation of the loom, and mechanism for weaving in ground weft threads at intervals to bind all the knotted pile threads and ground warp threads together.

11. In a loom, mechanism for continuous weaving, including means for holding and maintaining a loop of ground warp in weaving position, and knotting mechanism for repeatedly knotting a pile thread on both strands of said loop in the course of the continuous weaving operation of the loom, and pile-supporting mechanism operating to support the pile loops as they are formed.

12. In a loom, mechanism for continuous weaving, including means for holding and maintaining a loop of ground warp in weaving position, and knotting mechanism for repeatedly knotting a pile thread on both strands of said loop in the course of the continuous weaving operation of the loom, mechanism for weaving in ground weft threads at intervals to bind all the knotted pile threads and ground warp threads together, and pile-supporting mechanism operating to support the pile loops as they are formed.

13. In a loom, means to weave together ground warp and ground weft, and pile weaving means, including mechanism to move a pile wire into position sidewise to itself and to the fell of the weaving for supporting the pile loops.

14. In a loom, means to weave together ground warp and ground weft, and pile weaving means, including mechanism to move a pile wire bodily sidewise into position from one end of the loom for supporting the pile loops.

15. In a loom, means to support a series of warp strands in position for shedding, shedding means, means for knotting filler on said warp strands at one side of said shedding means, means entering between the warps and said filler for beating up the knotted filler on the warp past the point of shedding, and subsequently movable in a lateral direction away from between said warp strands and filler, and means for disengaging the shedding means from the warp to permit said beating up of the knotted filler.

16. In a loom, means to support a series of warp strands in weaving position, a beating-up reed, and operating mechanism therefor, including carrier means movable farther than the requisite beating-up movement of said reed, and means for the automatic disengagement of the reed from said carrier upon the arrival of the reed at full beaten-up position.

17. In a loom, means to support a series of warp strands in weaving position, a beating-up reed, and operating mechanism therefor, including reciprocatory carrier means movable farther than the requisite beating-up movement of said reed, and means for the automatic disengagement of the reed from said carrier upon the arrival of the reed at full beaten-up position, and the automatic reëngagement of the reed with the carrier upon the return movement of the latter.

18. In a loom, means to support a series of warp strands in weaving position, including a breast beam, means for automatically moving said breast beam as the weaving progresses, and means permitting said breast beam to yield forward in addition to the said movement.

19. In a loom, means to support a series of warp strands in weaving position, including a breast beam, movable supporting means for advancing automatically the breast beam as the weaving progresses, means permitting said breast beam to yield forward in addition to its said automatic advancing movement, shedding mechanism, and means to give said breast beam a warp-slackening movement for the shedding operation.

20. In a loom, means to support a series of warp strands in weaving position, including a movable breast beam, shedding mechanism, and means progressively to advance the normal position of said breast beam as the weaving advances.

21. In a loom, means to support a series of warp strands in weaving position, including a movable breast beam, shedding mechanism, means to give said breast beam a warp-slackening movement for the shedding operation, and a yielding give-away to afford extra yielding movement to said breast-beam when required.

22. In a loom, means for supporting in weaving position a predetermined length of warp strands to be woven into a predetermined size of fabric, weaving mechanism, and automatic compensating mechanism for permitting the opposite ends of the warp strands to approach each other progressively as said strands are taken up in the continued process of weaving.

23. In a loom, a knotter, including means to hold a loop end, a loop-holder to receive said loop end therefrom, means to deflect a second loop about said holding means within said loop end when the latter has been transferred to said loop-holder, shifting means to shift said loop end to said loop-holder, shifting means to shift said loop end back from said loop-holder to said holding means, and switching means to direct said second loop around said loop end after the latter has been restored to said holding means.

24. In a loom, a knotter, including means to hold a loop end, a loop-holder to receive said loop end therefrom, loop-operating mechanism, including means to deflect a second loop about said holding means within said loop end when the latter has been transferred to said loop-holder, shifting means to shift said loop end to said loop-holder, shifting means to shift said loop end back from said loop-holder to said holding means, and switching means to direct said second loop around said loop end after the latter has been restored to said holding means.

25. In a loom, warp-supporting means, pile thread knotting mechanism for knotting pile thread in a successive series of pile loops across the warps, and mechanism for weaving in transverse binder threads within the loops and in the space of said warps spanned by any given loop and between the knots formed at the opposite ends of and connected by said given loop.

26. In a loom, warp-supporting means, pile thread knotting mechanism for knotting successive series of pile loops across the warps, mechanism for weaving in transverse binder thread within the loops and in the space of said warps spanned by any given loop and between the knots formed at the opposite ends of and connected by said given loop, and beating-up mechanism.

27. In a loom, warp-supporting means, pile thread knotting mechanism for knotting successive pile threads in a series of pile loops across the warps, mechanism for weaving in transverse binder threads between the knots which are formed at the opposite ends of any given loop and which are connected by said given loop, and yielding beating-up mechanism to beat up irregularly the pile knots and binder threads.

28. In a loom, warp-supporting means, pile thread knotting mechanism for knotting successive series of pile loops across the warps, mechanism for weaving in transverse binder threads within said loops, loop-supporting means to support a transverse series of said loops, and mechanism to introduce said loop-supporting means behind a given series of knots before the formation of the loop is completed.

29. In a loom, warp-supporting means, weaving mechanism, including means to knot transverse rows of piles about the warps, means for beating up the knotted piles while the pile thread is still intact with the source of supply and before the cutting of the pile thread, means to weave in binder threads in alternate series with said rows of knotted piles prior to said cutting, pile thread delivery mechanism, and coöperating pattern control mechanism capable of varying selections for selecting from a general supply of yarns and delivering different pile threads to said knotting means across the pattern.

30. In a loom, warp-supporting means, weaving mechanism, including means to knot transverse rows of uncut pile loops about the warps, means for beating up the knotted pile loops while still uncut, means to weave in binder threads in alternate series with said rows of knotted pile loops, pile thread delivery mechanism, and coöperating pattern control mechanism for selecting and delivering different pile threads to said knotting means across the pattern.

31. In a loom, a pattern control, including a card, and indicating pins, each having coöperating means arranged in a single line for determining the varying positions of the pins and having a capacity of variety coextensive with the entire pattern.

32. In a loom, a pattern control, including a card, and coöperating indicating pins, said pins having small ends next to the cards and successively larger diameters at given distances back from said ends, and the cards having a line of position-determining holes spaced apart and arranged to coöperate with said pins, effecting the relative movements of the latter by correspondingly limiting the entrance of the pins into said holes.

33. In a loom, a pattern control, including a pattern card, indicating means actuated thereby, a series of thread carriers, and a selector whose position is governed by said indicating means to actuate the particular thread carrier in accordance with the pattern.

34. In a loom, a pattern control, including a series of thread carriers, selective means for actuating said thread carriers in accordance with the pattern, means to give the thread carriers a lateral movement transverse to the warp threads, and mechanism coöperating therewith to tie a knot with said thread on the fabric being woven.

35. In a loom, means to support the warp threads in weaving position, a pattern control, including a series of pile-thread-carrying needles, selective means for actuating said needles in accordance with the pile threads which it is desired to weave, means to give said selected needles a lateral movement transversely of said warp-thread-supporting means, and means coöperating with the aforesaid mechanism to tie said pile threads in knots about said warp threads.

36. In a loom, means to support warp threads in position for weaving, a member extending transversely of said supporting means and warp threads, pile-thread-carrying needles supported in said transversely extending member, means for moving said member transversely with relation to said warp threads for delivering the pile threads transversely of the warp threads, and means coöperating with the aforesaid mechanism to tie said pile threads in knots about said warp threads.

37. In a loom, weaving mechanism, including weaving means to secure a pile thread, a pile wire, and means to move the pile wire sidewise into position to hold up the pile.

38. In a loom, weaving mechanism, including means to weave a series of piles transversely of the loom, a pile wire, and means to move the pile wire transversely of said series into pile forming position.

39. In a loom, weaving mechanism, including means to weave a series of piles transversely of the loom, a pile wire and means to move the pile wire transversely of said series into pile forming position, said pile wire having end notches whereby the wires may be held removably by the moving means, and said moving means containing mechanism removably to engage said notches and hold the ends of the wire out firmly in proper position as the wire is being moved.

40. In a loom, weaving mechanism, including pile weaving means, a pile wire, and pile wire delivery mechanism including means to hold the wire out firmly at its opposite ends as the wire is being moved into pile forming position.

41. In a loom, weaving mechanism, including pile weaving means, a pile wire, pile wire delivery mechanism including means to hold the wire out firmly at its opposite ends, and automatically detachable means to move the wire into pile-forming position as the wire is so held at its ends.

42. In a loom, means for holding warp in loops extending from the fell lengthwise of the loom, and coöperating power-driven weaving means to automatically bend and weave the warp so held into a fabric.

43. In a loom, means for holding warp in loops with the two strands thereof extending throughout the length of the fabric, and coöperating power weaving means to interweave automatically therewith from one end of the loop strands a coöperating fabric-forming thread.

44. In a loom, means for holding warp in loops with the two strands thereof extending from the fell lengthwise of the loom, and coöperating power weaving means to interweave automatically therewith from the loop end of said strands a coöperating fabric-forming thread.

45. In a loom, warp-supplying means, a loop-holding device, and means to deliver a loop of warp from the warp supply to said loop-holding device previous to the weaving operation.

46. In a loom, warp-supplying means, a loop-holding device, means to deliver a loop of warp from the warp supply to said loop-holding device, and means for clamping in fixed position the free ends of the loop, previous to the weaving operation.

47. In a loom, a loop-holding device, and means to draw a loop of ground warp around said loop-holding device and thence back on itself to form a double strand of ground warp preliminary to the weaving operation.

48. In a loom, a loop-holding device, means to hold stationary the free end of a ground warp, and traveling means for looping said ground warp over said loop-holding device while said free end is still so held.

49. In a loom, a loop-holding device, means to hold stationary the free end of a ground warp, traveling means for looping said ground warp over said loop-holding device while said free end is still so held, that portion of the ground warp between said free end and the loop-holding device constituting one strand of the loop, and means for then clamping the free end of the other warp strand of the loop thus formed.

50. In a loom, a warp beam adjacent one end of the loom, a loop-holding device adjacent the other end of the loom, means adjacent the beam end of the loom to engage and hold the free end of the warp, means slidingly to engage the warp between said free end and the warp beam, and operating mechanism to cause said means to pull said warp out in a loop to be engaged by said loop-holding device.

51. In a loom, a warp beam adjacent one end of the loom, a loop-holding device adjacent the other end of the loom, means adjacent the beam end of the loom to engage and hold the free end of the warp, means slidingly to engage the warp between said free end and the warp beam, operating mechanism to cause said means to pull said warp out in a loop to be engaged by said loop-holding device, and a rack and pinion for traversing said engaging means lengthwise of the loom to lay a loop of said warp over said loop holding device.

52. In a loom, warp-supporting means, a series of separators spaced apart to enter between the warp strands and hold them in position to be shedded, rotary shedding means extending between said separators for lifting and lowering the warp strands in desired order for the shedding operation, means for rotating said shedding means, and mechanism coöperating with said shedding means for completing the weaving.

53. In a loom, weaving mechanism, including a rotary shaft extending across the loom, a series of separators spaced thereon to enter between the warp strands, and lifting fingers mounted between said separators, arranged for effecting the shedding operation in a predetermined order of lifting the ground warp strands as the shaft is rotated.

In testimony whereof, I have signed my name to this specification, in the presence of two subscribing witnesses.

THOMAS P. WALSH.

Witnesses:
M. J. SPALDING,
GEO. H. MAXWELL.